United States Patent
Saito et al.

(10) Patent No.: US 6,967,048 B2
(45) Date of Patent: Nov. 22, 2005

(54) OPTICAL RECORDING MEDIUM

(75) Inventors: Shinji Saito, Kanagawa (JP); Takeshi Kakuta, Kanagawa (JP); Toshio Ishida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/166,126

(22) Filed: Jun. 11, 2002

(65) Prior Publication Data

US 2003/0003261 A1 Jan. 2, 2003

(30) Foreign Application Priority Data

Jun. 13, 2001 (JP) ........................................ 2001-178954

(51) Int. Cl.⁷ ................................................ B32B 3/02
(52) U.S. Cl. .................... 428/64.1; 428/64.4; 428/64.8; 430/270.14
(58) Field of Search ............................... 428/64.1, 64.4, 428/64.8, 913; 430/270.14, 495.1, 945; 369/275.5, 283, 288

(56) References Cited

U.S. PATENT DOCUMENTS

| | | | |
|---|---|---|---|
| 4,412,231 A | 10/1983 | Namba et al. | |
| 4,465,767 A | 8/1984 | Oba et al. | |
| 5,075,145 A | 12/1991 | Yamamoto et al. | |
| 5,968,708 A | 10/1999 | Yashiro et al. | |
| 6,023,451 A | 2/2000 | Kashiwagi et al. | |
| 6,228,455 B1 | 5/2001 | Huang et al. | |
| 6,246,656 B1 | 6/2001 | Kawakubo et al. | |
| 6,506,469 B2 | 1/2003 | Takahashi et al. | |
| 6,576,320 B2 * | 6/2003 | Hayashida ................. | 428/64.1 |
| 6,627,288 B1 | 9/2003 | Ogiso et al. | |
| 6,699,591 B2 * | 3/2004 | Ishida et al. ................ | 428/641 |
| 6,808,782 B2 | 10/2004 | Usami et al. | |
| 2002/0145967 A1 | 10/2002 | Fujii et al. | |
| 2003/0017295 A1 | 1/2003 | Ishida et al. | |
| 2003/0031954 A1 * | 2/2003 | Kakuta ..................... | 430/270.2 |
| 2003/0081537 A1 * | 5/2003 | Shinotsuka .............. | 369/275.4 |
| 2003/0090990 A1 | 5/2003 | Ozawa et al. | |
| 2003/0118938 A1 * | 6/2003 | Ishida ................... | 430/270.16 |

FOREIGN PATENT DOCUMENTS

| | | |
|---|---|---|
| EP | 0 837 459 | 4/1998 |
| EP | 1 154 413 | 11/2001 |
| JP | 7-266703 | 10/1995 |
| JP | 11-31337 | 2/1999 |
| JP | 11-120617 | 4/1999 |
| JP | 2000-285520 | 10/2000 |
| JP | 2000-311392 | 11/2000 |
| JP | 2001-155383 | 6/2001 |

OTHER PUBLICATIONS

Kees Schep, et al., ISOM 2000, International Symposium On Optical Memory 2000, c/o Business Center for Academic Societies Japan, Technical Digest.

(Continued)

*Primary Examiner*—Elizabeth Mulvaney
(74) *Attorney, Agent, or Firm*—Sughrue Mion, PLLC

(57) ABSTRACT

An optical recording medium includes a substrate having successively disposed thereon a light-reflecting layer, a recording layer and a cover layer, with recording and playback being effected by irradiating the medium with a laser beam having a wavelength of 450 nm or less from the side disposed with the cover layer, wherein a sputter layer having a thickness of 1 to 80 nm is formed between the recording layer and the cover layer, and the sputter layer and the cover layer are adhered with an adhesive. The sputter layer preferably has a thickness within a range from 2 to 50 nm and is preferably formed from a simple substance of Si, Zn, Ag, Al, Ti, Sn or Ge, a compound comprising at least one of the simple substances, or a combination thereof.

16 Claims, 1 Drawing Sheet

OTHER PUBLICATIONS

Japanese Patent Application Laid–Open (JP–A) No. 08–045125, Feb. 1996.
Japanese Patent Application Laid–Open (JP–A) No. 04–064936, Feb. 1992.
U.S. Patent Application Publication No. 2002–0076648, Jun. 20, 2002 Berneth et al.
Japanese Patent Application Laid–Open (JP–A) No. 02–196689, Aug. 1990.
Japanese Patent Application Laid–Open (JP–A) No. 06–044608, Feb. 1994.
Japanese Patent Application Laid–Open (JP–A) No. 11–138993, May 1999.

* cited by examiner

OPTICAL RECORDING MEDIUM

BACKGROUND OF THE INVENTION

1. Field of the Invention

The present invention relates to an optical recording medium that has a recording layer made of an organic compound and with which recording and playback is possible using a laser beam having a specific wavelength.

2. Description of the Related Art

A CD-R is a writable, optical information recording medium (optical disc) on which information can be written only once by irradiation with laser light, and is widely known. This medium is advantageous in that information recorded on the CD-R can be played back using a commercial CD player, and the demand for CD-Rs has been escalating recently with the spread of personal computers. Further, writable digital versatile discs (DVD-Rs), on which digital high-vision images can be recorded, have also been put to practical use as media having a larger recording capacity than CD-Rs.

Such writable optical recording media typically comprise a disc substrate having successively disposed thereon a light-reflective layer (formed of, for example, Au), a recording layer formed of an organic compound, and a resin layer (may be referred to as a "cover layer" below) including an adhesive for adherence to the recording layer. Information is recorded on the disc by irradiating the disc with a laser from the side of the disc at which the resin layer is disposed. Specifically, the portion of the recording layer that is irradiated absorbs light, whereby temperature increases at the irradiated portion. The local increase in temperature deforms the recording layer (e.g., formation of pits) at the irradiated portion, whereby information is recorded. The recorded information is ordinarily reproduced by irradiating the disc with a laser having the same wavelength as that of the laser used to record the information, and by detecting a difference in reflectance between the region of the recording layer that has been deformed (recorded portion) and the region of the recording layer that has not been deformed (unrecorded portion).

Recently, high-vision television and networks such as the Internet have rapidly become more wide spread. In addition, the start of HDVT (High Definition Television) broadcasting is near at hand. As a result, large-capacity optical recording media capable of recording visual information easily and inexpensively are in demand. While DVD-Rs currently play a significant role as large-capacity recording media, the demand for media having greater recording capacity and higher density continues to escalate, and development of recording media that can cope with this demand is also needed. For this reason, development of recording media having ever greater storage capacity with which high-density recording can be effected with short wave light continues to advance. In particular, writable optical recording media on which information can be recorded only once are frequently used to backup or store large volumes of information over a long period of time. Therefore, the demand for such media development is high.

Ordinarily, the density of optical recording media can be increased by shortening the wavelength of the laser used for recording and playback, and by reducing beam spots through increasing NA (numerical aperture) of objective lenses. Recently, from red semiconductor lasers having a wavelength of 680 nm, 650 nm or 635 nm, to bluish purple semiconductor lasers (may be referred below as "bluish purple laser") that have a wavelength of 400 nm to 500 nm and are capable of super high-density recording, development has rapidly advanced. The development of optical recording media corresponding to these lasers is also being conducted. In particular, the development of optical recording systems using bluish purple lasers and high NA pickups has been explored since bluish purple lasers hit the market, and rewritable optical recording media and optical recording systems having phase change recording layers have already been announced as a DVR system ("ISOM2000", pp. 210–211). Thus, some progress has been made with respect to increasing the density of rewritable optical recording media.

In optical recording media for optical recording systems using bluish purple lasers and high NA pickups, it is preferable to reduce the thickness of the cover layer on which the laser is made incident in order to focus the high NA objective lens when the recording layer is irradiated with the bluish purple laser. For example, a thin film is used as the cover layer and adhered to the recording layer with an adhesive. The combined thickness of the cover layer and an adhesive layer formed by curing the adhesive is approximately 100 μm, and optimized in accordance with the wavelength of the laser used and NA.

However, in write-once optical recording media recorded and played back by optical recording systems using bluish purple lasers and high NA pickups, the use of an organic compound in the recording layer is problematic in that satisfactory recording characteristics are unobtainable.

While the cause of this problem is not entirely clear, it is assumed that fine unevenness occurs in the recording layer because the organic compound in the recording layer becomes dissolved into the adhesive of the adhesive layer.

SUMMARY OF THE INVENTION

The present invention was devised in view of the foregoing problems. It is an object of the invention to provide a write-once optical recording medium having high density and excellent recording characteristics. This object is achieved by the following means.

An optical recording medium of the invention comprises a substrate having successively disposed thereon a light-reflecting layer, a recording layer and a cover layer, with recording and playback being effected by irradiating the medium with a laser beam having a wavelength of 450 nm or less from the side disposed with the cover layer, wherein a sputter layer having a thickness within a range from 1 to 80 nm is formed between the recording layer and the cover layer, and the sputter layer and the cover layer are adhered with an adhesive.

The sputter layer preferably has a thickness within a range from 2 to 50 nm, and preferably includes a simple substance of Si, Zn, Ag, Al, Ti, Sn or Ge, a compound comprising at least one of the simple substances, or a combination thereof. Additionally, the sputter layer preferably transmits at least 70% of the laser beam used in recording and playback.

Moreover, the recording layer preferably includes an organic compound having a maximum absorption wavelength of 400 nm or less.

The thickness of an adhesive layer made of the adhesive is preferably within a range from 1 to 1,000 μm, and the adhesive preferably comprises a radiation-curable resin.

DETAILED DESCRIPTION OF THE INVENTION

Figure 1:
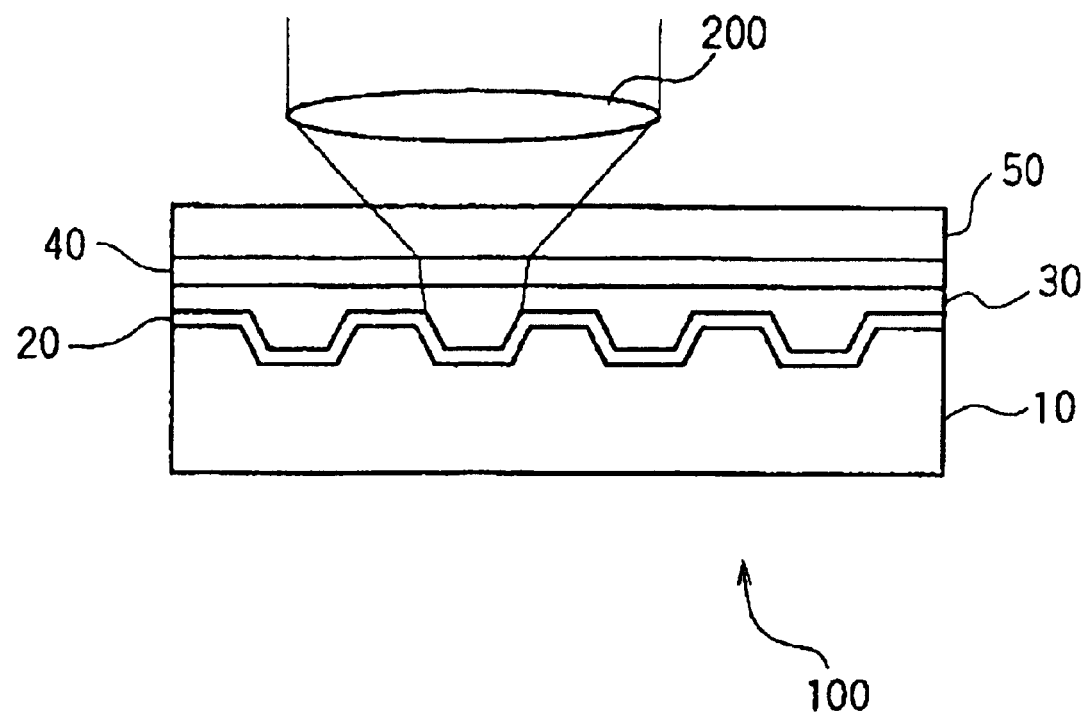
FIG. 1 is a schematic sectional view showing an exemplary embodiment of an optical recording medium of the invention.

FIG. 1 is a schematic sectional view showing an exemplary embodiment of an optical recording medium 100 of the invention. As shown in FIG. 1, the optical recording medium 100 generally includes a substrate 10 having successively disposed thereon a light-reflecting layer 20, a recording layer 30, a sputter layer 40 and a cover layer 50. However, the optical recording medium 100 may include other layers as needed. Information is recorded on or played back from the optical recording medium 100 conduct by irradiating the medium 100 with a laser beam having a wavelength of 450 nm or less.

Substrate

Examples of material constituting the substrate 10 include glass, polycarbonates, acrylic resins such as polymethyl methacrylate, vinyl chloride resins such as polyvinyl chloride and a vinyl chloride copolymer, epoxy resins, amorphous polyolefins and polyesters. These may be used either singly or in combination. A polycarbonate is preferable in view of resistance to moisture, dimensional stability and cost. The thickness of the substrate 10 is generally within a range from 0.4 to 1.5 mm and preferably within a range from 1.1 to 1.3 mm.

A surface of the substrate 10 preferably includes a tracking groove or a pre-groove for information such as an address signal. The pre-groove is preferably directly formed in the substrate by injection-molding or extrusion-molding a resin material such as a polycarbonate.

The pre-groove may also be formed by disposing a pre-groove layer. Examples of materials usable for the pre-groove layer include a mixture of a photopolymerization initiator and at least one monomer (or oligomer) selected from a monoester, a diester, a triester and a tetraester of acrylic acid. The pre-groove layer can be formed by, for example, first coating a mixed solution of the acrylic ester and the polymerization initiator on a precisely made stamper, placing the substrate 10 on the coating solution layer, irradiating the coating solution layer with ultraviolet light through the substrate 10 or the stamper to thereby cure the coating solution layer and adhere the same to the substrate 10, and thereafter separating the substrate 10 from the stamper. The thickness of the pre-groove layer is generally within a range from 0.01 to 100 $\mu$m, and preferably within a range from 0.05 to 50 $\mu$m.

As the substrate 10, it is preferable to use a substrate having formed therein a pre-groove of a track pitch that is narrower than the track pitch of a CD-R or DVD-R, in order to attain higher recording density. The track pitch of the pre-groove in the substrate 10 is within a range from 100 to 600 nm.

It is also preferable that the depth of the pre-groove is within a range from 20 to 150 nm and its half width is within a range from 50 to 250 nm. Because the optical recording medium of the invention has high sensitivity, recording is possible even with low laser power, and there is an advantage in that a less expensive laser can be used or the use life of the laser can be prolonged.

It is also preferable to dispose an undercoat layer on the surface of the substrate 10 on which the light reflection layer 20 is formed, in order to improve flatness and increase adhesive strength.

Examples of materials usable for the undercoat layer include polymers such as polymethyl methacrylate, an acrylic acid-methacrylic acid copolymer, a styrene-maleic anhydride copolymer, polyvinyl alcohol, N-methylolacrylamide, a styrene-vinyltoluene copolymer, polyethylene chlorosulfonate, nitrocellulose, polyvinyl chloride, a chlorinated polyolefin, a polyester, a polyimide, a vinyl acetate-vinyl chloride copolymer, an ethylene-vinyl acetate copolymer, polyethylene, polypropylene and polycarbonate, and surface modifiers such as a silane coupling agent.

The undercoat layer can be formed by dissolving or dispersing the material in an appropriate solvent and then coating the coating solution on the surface of the substrate 10 by a coating method such as spin coating, dip coating or extrusion coating. The thickness of the undercoat layer is generally within a range from 0.005 to 20 $\mu$m, and preferably within a range from 0.01 to 10 $\mu$m.

Light-Reflecting Layer

The light-reflecting layer 20 is formed for improving reflectance in playback of information. Material forming the light-reflecting layer 20 preferably has a laser beam reflectance of at least 70%. Examples thereof include metals, half metals and stainless steels such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi. These materials may be used either singly or in combination or as an alloy. The light-reflecting layer 20 preferably contains one of Au and Ag, with the higher the content thereof being more preferable. The light-reflecting layer 20 can be formed on the substrate 10 by, for example, vacuum deposition, sputtering or ion plating of the foregoing reflection material. The thickness of the light-reflecting layer 20 is generally within a range from 10 to 800 nm, preferably within a range from 20 to 500 nm, and more preferably within a range from 50 to 300 nm.

Recording Layer

The recording layer 30 is preferably formed of an organic compound having a maximum absorption of 400 nm or less to enable information to be recorded on and played back from the medium 100 by irradiating the medium 100 with a laser having a wavelength of 450 nm. The recording layer 30 may also be formed of an organic compound having a second absorption band in a wavelength region exceeding 400 nm.

Preferable examples of the organic compound include compounds described in Japanese Patent Application Laid-open (JP-A) Nos. 4-74690, 8-127174, 11-53758, 11-334204, 11-334205, 11-334206, 11-334207, 2000-43423, 2000-108513 and 2000-158818, triazole, triazine, cyanine, merocyanine, aminobutadiene, phthalocyanine, cinnamic acid, viologen, azo, oxonolbenzoxazole and benzotriazole. More preferable are cyanine, aminobutadiene, benzotriazole and phthalocyanine.

The recording layer 30 can be formed by dissolving the organic compound such as a cyanine dye and, as required, a binder in a solvent to form a coating solution, coating the coating solution on the surface of the light-reflecting layer 20, and then allowing the coating solution to dry.

Moreover, as a method of dissolving the recording material, ultrasonic treatment, homogenizer treatment, disper treatment, sand mill treatment or stirrer agitation treatment can be applied. In addition, the coating solution may contain additives such as an antioxidant, an UV absorber, a plasticizer and a lubricant.

Examples of the solvent of the coating solution of the recording layer 30 includes esters such as butyl acetate and cellosolve acetate; ketones such as methyl ethyl ketone, cyclohexanone and methyl isobutyl ketone; chlorinated hydrocarbons such as dichloromethane, 1,2-dicyloroethane and chloroform; amides such as dimethylformamide; hydrocarbons such as cyclohexane; ethers such as tetrahydrofuran, ethyl ether and dioxane; alcohols such as ethanol, n-propanol, isopropanol, n-butanol and diacetone alcohol; fluorine-containing solvents such as 2,2,3,3-tetrafluoropropanol; and glycol ethers such as ethylene glycol monomethyl ether, ethylene glycol monoethyl ether and propylene glycol monomethyl ether. These solvents can be used either singly or in combination in consideration of the solubility of the organic compound to be used.

Examples of the binder include natural organic polymers such as gelatin, cellulose derivatives, dextran, rosin and rubber; and synthetic organic polymers such as initial condensates of hydrocarbon resins, for example, polyurethane, polyethylene, polypropylene, polystyrene and polyisobutylene, vinyl resins, for example, polyvinyl chloride, polyvinylidene chloride and a polyvinyl chloride-polyvinyl acetate copolymer, acrylic resins, for example, polymethyl acrylate and polymethyl methacrylate, and thermosetting resins, for example, polyvinyl alcohol, polyethylene chloride, an epoxy resin, a butyral resin, rubber derivatives and a phenyl-formaldehyde resin. When the binder is used in combination as a material of the recording layer 30, the amount of the binder is 0.2 to 20 parts by mass, preferably 0.5 to 10 parts by mass, more preferably 1 to 5 parts by mass per 100 parts by mass of the organic compound 100. Storage stability of the recording layer 30 can also be improved by incorporating the binder therein.

The concentration of the organic compound in the coating solution is generally within a range from 0.01 to 10% by mass, and preferably within a range from 0.1 to 5% by mass.

The coating solution can be coated by, for example, spray coating method, spin coating, dip coating, roll coating, blade coating, doctor roll coating, or screen printing. The recording layer 30 may comprise a single layer or plural layers. The thickness of the recording layer 30 is generally within a range from 20 to 500 nm, and preferably within a range from 50 to 300 nm. Further, the recording layer 30 may be formed not only on one side of the substrate 10 but also on both sides thereof.

Coating temperature is generally within a range from 23 to 50° C., preferably 24 to 40° C., and more preferably within a range from 25 to 37° C.

The recording layer 30 may also include various fading inhibitors to improve light resistance of the recording layer 30.

As the fading inhibitor, a singlet oxygen quencher is generally used. Singlet oxygen quenchers already described in known publications such as patent specifications can be used.

Specific examples thereof can include those described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995 and 4-25492, Japanese Patent Application Publication Nos. 1-38680 and 6-26028, German Patent No. 350399 and Nihon Kagakukaishi, October, 1992, p. 1141.

The content of the singlet oxygen quencher is usually within a range from 0.1 to 50% by mass, preferably within a range from 0.5 to 45% by mass, more preferably 3 to 40% by mass, and especially preferably within a range from 5 to 25% by mass based on the total solid content of the recording layer 30.

Sputter Layer

The sputter layer 40 transmits preferably at least 70%, more preferably at least 90% of the laser beam used in recording and playback.

Although there are no particular limitations on the material of the sputter layer 40, it is preferably a simple substance selected from the group consisting of Si, Zn, Ag, Al, Ti, Sn, W, Cu, Ge, Mn, Sb or Zr, or a compound (oxide, nitride or sulfide) comprising at least one of the simple substances. More preferable is a simple substance or a compound of Si, Zn, Ag, Al, Ti, Sn or Ge. These materials can be selectively be used, as required, in consideration of properties such as softening point and rigidity, and they may be used either singly or in combination.

The sputter layer 40 can be formed on the recording layer 30 using, for example, a known sputtering device such as a RF sputtering device manufactured by Junaxis. The thickness of the sputter layer 40 is generally within a range from 1 to 80 nm, preferably from 2 to 50 nm, and more preferably within a range from 3 to 20 nm.

Adhesive Layer

An adhesive layer (not shown) for adhering the cover layer 50 is formed on the sputter layer 40. The adhesive used in the adhesive layer is preferably formed of a radiation-curable resin. In particular, a resin having low curing shrinkage is preferable in view of preventing the optical recording medium (disc) from becoming warped. The thickness of the adhesive layer is, view of imparting flexibility, preferably within a range from 1 to 1,000 $\mu$m, more preferably within a range from 5 to 500 $\mu$m, and especially preferably within a range from 10 to 100 $\mu$m.

It is also preferable for the radiation-curable resin to have at least two radiation functional double bonds in a molecule.

Examples of the radiation-curable resin include acrylic esters, acrylamides, methacrylic esters, methacrylic amides, allyl compounds, vinyl ethers and vinyl esters. Difunctional or higher functional acrylate compounds and methacrylate compounds are more preferable.

The radiation-curable resin can include aliphatic diols to which acrylic acid and methacrylic acid have been added. Examples thereof include ethylene glycol diacrylate, propylene glycol diacrylate, butanediol diacrylate, hexanediol diacrylate, diethylene glycol diacrylate, triethylene glycol diacrylate, tetraethylene glycol diacrylate, neopentyl glycol diacrylate, tripropylene glycol diacrylate, ethylene glycol dimethacrylate, propylene glycol dimethacrylate, butanediol dimethacrylate, hexanediol dimethacrylate, diethylene glycol dimethacrylate, triethylene glycol dimethacrylate, tetraethylene glycol dimethacrylate, neopentyl glycol dimethacrylate and tripropylene glycol dimethacrylate.

Further, polyether acrylates and polyether methacrylates obtained by adding acrylic acid and methacrylic acid to polyether polyols such as polyethylene glycol, polypropylene glycol and polytetramethylene glycol, and polyester acrylates and polyester methacrylates formed by adding acrylic acid and methacrylic acid to polyester polyols obtained from known dibasic acids and glycols can also be used.

Polyurethane acrylates and polyurethane methacrylates obtained by adding acrylic acid and methacrylic acid to polyurethanes resulting from a reaction of known polyols and diols with known polyisocyanates can also be used.

Bisphenol A, bisphenol F, hydrogenated bisphenol A, hydrogenated bisphenol F and alkylene oxide adducts thereof with acrylic acid and methacrylic acid added, compounds having a cyclic structure, such as an isocyanuric acid alkylene oxide-modified diacrylate, an isocyanuric acid alkylene oxide-modified dimethacrylate, a tricyclodecanedimethanol diacrylate and tricyclodecanedimethanol dimethacrylate can also be used.

Although description has been given of radiation-curable resins, commercially available UV-curable resins (UV-curable adhesives) such as "SD-640" and "SD-347" (both are trade names: made by Dainippon Ink And Chemicals, Inc.) can also be used.

As the rays used to cure the radiation-curable resin, electron rays and ultraviolet rays may be preferably used. When using an ultraviolet ray, it becomes necessary to add a photopolymerization initiator to compounds described below.

An aromatic ketone can be used as the photopolymerization initiator. There are no particular limitations on the aromatic ketone. The aromatic ketone generates a line spectral of a mercury lamp ordinarily used as an ultraviolet irradiation light source. Those having a relatively large absorbency coefficient in wavelengths of 254 nm, 313 nm and 865 nm are preferable. Typical examples thereof include acetophenone, benzophenone, benzoin ethyl ether, benzyl methyl ketal, benzyl ethyl ketal, benzoin isobutyl ketone, hydroxydimethyl phenyl ketone, 1-hydroxycyclohexyl phenyl ketone, 2,2-diethoxyacetophenone and Michler's ketone. Thus, various aromatic ketones can be used.

The mixing ratio of the aromatic ketone is 0.5 to 20 parts by mass, preferably 2 to 15 parts by mass, more preferably 3 to 10 parts by mass per 100 parts by mass of the ultraviolet-curable resin. As the ultraviolet-curable adhesive, products already containing a photopolymerization initiator are commercially available and may be used.

A mercury lamp is used as the ultraviolet light source. The mercury lamp uses a lamp of 20 to 200 W/cm at a rate of 0.3 m/min to 20 m/min. It is generally preferable for the distance between the substrate and the mercury lamp to be 1 to 30 cm.

As an electron-ray accelerator, a scanning system, a double scanning system or a curtain beam system can be employed. A curtain beam system is preferable because large output can be obtained at a relatively low cost. Acceleration voltage of the electron rays is 100 to 1,000 kV, and preferably 150 to 300 kV, and an absorption dose of the electron rays is 0.5 to 20 Mrad, and preferably 1 to 10 Mrad. When the acceleration voltage is less than 10 kV, transmission of energy is insufficient. When the acceleration voltage exceeds 1,000 kV, the efficiency with which energy is used in polymerization becomes poor and uneconomical.

Cover Layer

The cover layer 50 is formed on the sputter layer 40 using the adhesive (through the adhesive layer). Transmission of the laser beam used in recording and playback is preferably at least 80%, and more preferably at least 90%. Further, the cover layer 50 is preferably a resin sheet having a surface roughness Ra of 5 nm or less. Examples of the resin sheet include a polycarbonate (for example, trade name: PURE ACE, made by Teijin Ltd., and trade name: PANLITE, made by Teijin Ltd.), cellulose triacetate (tradename: FUJI TAC, made by Fuji Photo Film Co., Ltd.) and PET (trade name: LUMILAR, made by Toray Industries, Inc.). A polycarbonate and cellulose triacetate are preferable. The surface roughness Ra of the cover layer 50 is determined in accordance with factors such as the type of resin, method by which the film is formed, and the presence or absence of a filler. The surface roughness Ra of the cover layer 50 is measured by, for example, a HD 2000 (trade name, manufactured by WYKO).

The thickness of the cover layer 50 is determined in accordance with NA and the wavelength of the laser beam used in recording and playback. The thickness is preferably within a range from 0.005 to 1 mm, and more preferably within a range from 0.01 to 0.5 mm.

Other Layers

A protecting layer may be disposed on the cover layer 50. The protecting layer may be formed of, for example, an UV-curable resin.

The protecting layer can be formed by, for example, spin coating a UV-curable adhesive on the surface of the cover layer 50 and then irradiating the adhesive with ultraviolet light from a UV irradiation lamp to cure the UV-curable resin.

The surface roughness of the side of the optical recording medium 100 at which the laser is made incident is determined in accordance with factors such as the surface roughness of the cover layer 50, the surface roughness of the substrate 10, conditions in which forming the light reflection layer 20 is formed, the type of the recording layer 30, film-forming conditions, the type of the adhesive layer, coating conditions, and the type and the coating conditions of the protecting layer.

In the optical recording medium 100 of the invention, the recording and the playback of an information are conducted as follows. The optical recording medium 100 is rotated at a predetermined linear velocity (0.5 to 10 m/sec) or a predetermined angular velocity and irradiated with a recording light such as a bluish purple laser (having, for example, a wavelength of 405 nm) from the side of the cover layer 50 through the objective lens 200. The recording layer 30 absorbs the light, whereby temperature increases locally. Consequently, pits are generated to change the optical characteristics, whereby information is recorded. The recorded information is played back by rotating the optical recording medium 100 at a predetermined linear velocity and irradiating the medium 100 with the bluish purple laser beam from the side of the cover layer 50, whereby reflected light is detected.

EXAMPLES

The invention is illustrated in detail below by way of examples. However, the invention is not limited thereto.

Example 1

Production of Optical Recording Medium A substrate of polycarbonate resin (trade name: PANLITE AD5503, made by Teijin Ltd.) including a spiral groove (depth 100 nm, width 0.120 $\mu$m, track pitch 0.3 $\mu$m) and having a thickness of 1.1 mm and a diameter of 120 mm was obtained by injection molding. Ag was sputtered on the grooved surface of the resulting substrate to form a light-reflecting layer having a thickness of 100 nm.

2 g of a phthalocyanine organic compound A (maximum absorption: 340 nm) was then mixed with 148 ml of 2,2,3,3-tetrafluoropropanol and dissolved by ultrasonic treatment for 2 hours to prepare a coating solution for forming a recording layer. The resulting coating solution was spin-coated on the light-reflecting layer at 23° C. and 50% RH while changing the rotational speed from 300 to 4,000 rpm. Thereafter, the resulting product is allowed to dry for 2 hours at 23° C. and 50% RH to form a recording layer (thickness: 100 nm).

ZnS—SiO$_2$ was sputtered on the recording layer to a thickness of 20 nm to form a sputter layer. An UV-curable adhesive (trade name: SD-347, made by Dainippon Ink And Chemicals, Inc.; solubility in the organic compound being 0.05% by weight) was spin-coated on the sputter layer at 200 rpm. A polycarbonate sheet (trade name: PURE ACE, made by Teijin Ltd., Ra: 1 nm) was laid on the coated UV-curable adhesive layer, and the UV-curable adhesive was then spread over the entire surface of the recording layer while changing the rotational speed from 300 to 4,000 rpm. Subsequently, the adhesive was irradiated with ultraviolet light from an UV irradiation lamp to cure the UV-curable adhesive and form a cover layer.

Further, a UV-curable adhesive (tradename: SD-347, made by Dainippon Ink And Chemicals, Inc.) was spin-coated on the cover layer at 200 rpm, and the UV-curable adhesive was then spread over the entire surface of the cover layer while changing the rotational speed from 300 to 4,000 rpm. Subsequently, the adhesive was irradiated with ultraviolet light from an UV irradiation lamp to cure the UV-curable adhesive and form a protecting layer. In this manner, an optical recording medium of Example 1 was produced.

Evaluation of Recording Characteristics (1) C/N (Carrier to Noise Ratio)

The resulting optical recording medium was subjected to recording and playback under conditions of a clock frequency of 66 MHz and a linear velocity of 5.6 m/s with a signal of a single frequency (2T=0.13 μm) using a recording/playback evaluation machine (trade name: DDU 1000, manufactured by Pulse Tec) equipped with a laser of 405 nm and a pickup of NA:0.85, and C/N was measured with a spectrum analyzer.

(2) Jitter

The resulting optical recording medium was subjected to recording and playback under conditions of a clock frequency of 66 MHz and a linear velocity of 5.6 m/s with a 1–7 PP modulating signal using a recording/playback evaluation machine (trade name: DDU 1000, manufactured by Pulse Tec) equipped with a laser of 405 nm and a pickup of NA:0.85, and jitter was measured with a time interval analyzer.

The results of the evaluation are shown in Table 1.

Example 2

An optical recording medium was produced in the same manner as in Example 1 except that the phthalocyanine organic compound A of Example 1 was replaced with a cyanine organic compound B (absorption wavelength: 373 nm).

The resulting optical recording medium was subjected to the same testing of Example 1 to evaluate recording characteristics. The results are shown in Table 1.

Example 3

An optical recording medium was produced in the same manner as in Example 1 except that the phthalocyanine organic compound A of Example 1 was replaced with an aminobutadiene organic compound C (absorption wavelength: 359 nm).

The resulting optical recording medium was subjected to the same testing of Example 1 to evaluate recording characteristics. The results are shown in Table 1.

Example 4

An optical recording medium was produced in the same manner as in Example 1 except that the phthalocyanine organic compound A of Example 1 was replaced with a benzotriazole organic compound D (absorption wavelength: 373 nm).

The resulting optical recording medium was subjected to the same testing of Example 1 to evaluate recording characteristics. The results are shown in Table 1.

Examples 5 to 8

Optical recording media were produced in the same manner as in Example 1 except that the thickness of the sputter layer of Example 1 was changed from 20 nm to 80 nm, 50 nm, 10 nm and 2 nm respectively.

The resulting optical recording media were subjected to the same testing of Example 1 to evaluate recording characteristics. The results are shown in Table 1.

Examples 9 to 13

Optical recording media were produced in the same manner as in Example 1 except that the material constituting the sputter layer in Example 1 was changed from ZnS—SiO$_2$ to AgO$_2$, ZnS, GeO, Si and Ti respectively.

The resulting optical recording media were subjected to the same testing of Example 1 to evaluate recording characteristics. The results are shown in Table 1.

Comparative Example 1

An optical recording medium was produced in the same manner as in Example 1 except that the sputter layer was not formed between the recording layer and the cover layer.

The resulting optical recording medium was subjected to the same testing of Example 1 to evaluate recording characteristics. The results are shown in Table 1.

Comparative Example 2

An optical recording medium was produced in the same manner as in Example 1 except that the thickness of the sputter layer was changed from 20 nm to 100 nm.

The resulting optical recording medium was subjected to the same testing of Example 1 to evaluate recording characteristics. The results are shown in Table 1.

TABLE 1

| | | Sputter layer | | |
|---|---|---|---|---|
| | Organic Compound | Material | Thickness (mm) | C/N (dB) | Jitter (%) |
| Ex. 1 | phthalocyanine A | ZnS—SiO$_2$ | 20 | 55 | 7.3 |
| Ex. 2 | cyanine B | ZnS—SiO$_2$ | 20 | 52 | 7.6 |
| Ex. 3 | aminobutadiene C | ZnS—SiO$_2$ | 20 | 51 | 8.0 |
| Ex. 4 | benzotriazole D | ZnS—SiO$_2$ | 20 | 54 | 7.3 |
| Ex. 5 | phthalocyanine A | ZnS—SiO$_2$ | 80 | 48 | 8.1 |
| Ex. 6 | phthalocyanine A | ZnS—SiO$_2$ | 50 | 54 | 7.7 |
| Ex. 7 | phthalocyanine A | ZnS—SiO$_2$ | 10 | 57 | 7.0 |
| Ex. 8 | phthalocyanine A | ZnS—SiO$_2$ | 2 | 53 | 8.2 |
| Ex. 9 | phthalocyanine A | AgO$_2$ | 20 | 53 | 7.5 |
| Ex. 10 | phthalocyanine A | ZnS | 20 | 58 | 7.0 |
| Ex. 11 | phthalocyanine A | GeO | 20 | 57 | 7.1 |
| Ex. 12 | phthalocyanine A | Si | 20 | 57 | 7.2 |
| Ex. 13 | phthalocyanine A | Ti | 20 | 56 | 7.6 |
| Comp. Ex. 1 | phthalocyanine A | — | — | 28 | 12.1 |
| Comp. Ex. 2 | phthalocyanine A | ZnS—SiO$_2$ | 100 | 37 | 9.9 |

As indicated by the results in Table 1, it was found that good recording characteristics and good jitter are achieved by disposing the sputter layer between the recording layer and the cover layer.

Furthermore, because the thickness of the sputter layer is 80 nm or less, and preferably 50 nm or less, heat applied to and decomposing the recording layer is transferred to the cover layer, making it possible to expedite deformation of the cover layer. The deformation of the cover layer scatters the laser beam to increase a degree of modulation and improve C/N. Meanwhile, when the sputter layer is thick, as in Comparative Example 2, there are problems in that the heat is released from the sputter layer and the rigidity of the sputter layer itself is increased, which makes it difficult for the cover layer to be deformed.

In the optical recording medium of the invention corresponding to the bluish purple laser and the high NA pickup, the sputter layer is formed between the recording layer and the cover layer, whereby unevenness in the recording layer, which adversely effects recording characteristics, can be prevented. Accordingly, the invention can provide a write-once optical recording medium having high density and excellent recording characteristics.

What is claimed is:

1. An optical recording medium comprising a substrate having successively disposed thereon a light-reflecting layer, a recording layer and a cover layer, with recording and playback being effected by irradiating the medium with a laser beam having a wavelength of 450 nm or less from the side disposed with the cover layer, wherein a sputter layer having a thickness of 1 to 80 nm is formed between the recording layer and the cover layer, and the sputter layer and the cover layer are adhered with an adhesive.

2. The optical recording medium according to claim 1, wherein the thickness of the sputter layer is within a range from 2 to 50 nm.

3. The optical recording medium according to claim 1, wherein the sputter layer includes a simple substance of Si, Zn, Ag, Al, Ti, Sn or Ge, a compound comprising at least one of the simple substances, or a combination thereof.

4. The optical recording medium according to claim 2, wherein the sputter layer includes a simple substance of Si, Zn, Ag, Al, Ti, Sn or Ge, a compound comprising at least one of the simple substances, or a combination thereof.

5. The optical recording medium according to claim 1, wherein the recording layer includes an organic compound having a maximum absorption wavelength of 400 nm or less.

6. The optical recording medium according to claim 2, wherein the recording layer includes an organic compound having a maximum absorption wavelength of 400 nm or less.

7. The optical recording medium according to claim 3, wherein the recording layer includes an organic compound having a maximum absorption wavelength of 400 nm or less.

8. The optical recording medium according to claim 4, wherein the recording layer includes an organic compound having a maximum absorption wavelength of 400 nm or less.

9. The optical recording medium according to claim 1, wherein the sputter layer transmits at least 70% of the laser beam used in recording and playback.

10. The optical recording medium according to claim 2, wherein the sputter layer transmits at least 70% of the laser beam used in recording and playback.

11. The optical recording medium according to claim 3, wherein the sputter layer transmits at least 70% of the laser beam used in recording and playback.

12. The optical recording medium according to claim 5, wherein the sputter layer transmits at least 70% of the laser beam used in recording and playback.

13. The optical recording medium according to claim 3, wherein the thickness of the sputter layer is within a range from 2 to 50 nm.

14. The optical recording medium according to claim 5, wherein the thickness of the sputter layer is within a range from 2 to 50 nm.

15. The optical recording medium according to claim 1, wherein the thickness of an adhesive layer made of the adhesive is within a range from 1 to 1,000 $\mu$m.

16. The optical recording medium according to claim 1, wherein the adhesive comprises a radiation-curable resin.

* * * * *